US010802904B2

(12) United States Patent
Bradley et al.

(10) Patent No.: US 10,802,904 B2
(45) Date of Patent: Oct. 13, 2020

(54) TECHNIQUES FOR REPAIRING AN INOPERABLE AUXILIARY DEVICE USING ANOTHER DEVICE

(71) Applicant: Apple Inc., Cupertino, CA (US)

(72) Inventors: Bob Bradley, San Jose, CA (US); Per Love Hornquist Astrand, Santa Clara, CA (US)

(73) Assignee: Apple Inc., Cupertino, CA (US)

( * ) Notice: Subject to any disclaimer, the term of this patent is extended or adjusted under 35 U.S.C. 154(b) by 235 days.

(21) Appl. No.: 15/717,824

(22) Filed: Sep. 27, 2017

(65) Prior Publication Data

US 2018/0336087 A1 Nov. 22, 2018

Related U.S. Application Data

(60) Provisional application No. 62/507,187, filed on May 16, 2017.

(51) Int. Cl.
*G06F 11/00* (2006.01)
*G06F 11/07* (2006.01)
(Continued)

(52) U.S. Cl.
CPC ...... *G06F 11/0793* (2013.01); *G06F 11/0709* (2013.01); *G06F 11/0742* (2013.01); *G06F 11/0751* (2013.01); *G06F 11/0772* (2013.01); *H04L 63/0428* (2013.01); *H04L 63/0435* (2013.01); *H04L 63/06* (2013.01); *H04W 12/003* (2019.01); *H04W 12/04* (2013.01); *H04W 4/80* (2018.02)

(58) Field of Classification Search
CPC .................................................. G06F 11/0739
See application file for complete search history.

(56) References Cited

U.S. PATENT DOCUMENTS 5,713,017 A * 1/1998 Lin ..................... G06F 11/1435
8,850,421 B2 * 9/2014 Proud ....................... G06F 8/65
717/172

(Continued)

OTHER PUBLICATIONS

End-to-end, TechTarget (Year: 2019).*
International application No. PCT/US2018/027995—International Search Report and Written Opinion dated Aug. 2, 2018.

*Primary Examiner* — Jonathan D Gibson
(74) *Attorney, Agent, or Firm* — Dickinson Wright RLLP

(57) ABSTRACT

The embodiments set forth a technique for enabling a computing device to cure a configuration issue associated with an auxiliary computing device. According to some embodiments, the technique can include the steps of (1) receiving, from the auxiliary computing device, a request to repair the configuration issue, where the request includes device information associated with the auxiliary computing device, and (2) in response to determining, based on the device information, that the auxiliary computing device is known to the computing device: (i) establishing a secure communication link with the auxiliary computing device, (ii) identifying at least one problem associated with the configuration issue, (iii) generating repair information based on the at least one problem, and (iv) transmitting the repair information to the auxiliary computing device over the secure communication link to cause the auxiliary computing device to cure the at least one problem.

20 Claims, 7 Drawing Sheets

(51) Int. Cl.
  *H04L 29/06* (2006.01)
  *H04W 12/04* (2009.01)
  *H04W 12/00* (2009.01)
  *H04W 4/80* (2018.01)

(56) References Cited

U.S. PATENT DOCUMENTS

| | | | |
|---|---|---|---|
| 10,055,280 B2* | 8/2018 | Seibert | G06F 11/0793 |
| 10,269,452 B2* | 4/2019 | Volpe | A61N 1/3968 |
| 2008/0175187 A1 | 7/2008 | Lowry et al. | |
| 2009/0149261 A1* | 6/2009 | Chen | G07F 17/3202 |
| | | | 463/42 |
| 2009/0177913 A1* | 7/2009 | Quinn | G06F 11/0748 |
| | | | 714/4.1 |
| 2011/0085526 A1 | 4/2011 | Joseph et al. | |
| 2011/0093741 A1* | 4/2011 | Liang | G06F 11/1417 |
| | | | 714/6.1 |
| 2011/0225619 A1* | 9/2011 | Kesireddy | H04N 7/173 |
| | | | 725/115 |
| 2012/0089973 A1* | 4/2012 | Bhat | G06F 8/658 |
| | | | 717/169 |
| 2012/0250577 A1 | 10/2012 | Kimura et al. | |
| 2013/0023339 A1 | 1/2013 | Davis et al. | |
| 2013/0283256 A1* | 10/2013 | Proud | G06F 8/65 |
| | | | 717/172 |
| 2014/0364056 A1 | 12/2014 | Belk et al. | |
| 2015/0261598 A1* | 9/2015 | Balasubramanian | G06F 11/0793 |
| | | | 714/10 |
| 2016/0249159 A1* | 8/2016 | Berg | G07C 9/00103 |
| 2016/0253471 A1* | 9/2016 | Volpe | A61N 1/3968 |
| | | | 607/5 |
| 2016/0316021 A1* | 10/2016 | Andersen | H04L 67/14 |
| 2017/0318483 A1* | 11/2017 | Zhang | H04W 88/08 |
| 2017/0344420 A1* | 11/2017 | Seibert | G06F 11/0793 |
| 2017/0373964 A1* | 12/2017 | Yang | H04W 40/18 |
| 2018/0276913 A1* | 9/2018 | Garcia | B60L 58/16 |
| 2018/0336087 A1* | 11/2018 | Bradley | G06F 11/0793 |

* cited by examiner

210 – A Computing Device 102-1 Identifies A Level Of Inoperability And Broadcasts Messages (e.g., Via Packets) To Nearby Computing Devices 220 – A Computing Device 102-2 Identifies The Computing Device 102-1 And Authenticates With The Computing Device 102-1 Based On Information Established During A Previous Pairing 230 – The Computing Device 102-1 Provides A Description Of At Least One Problem That Is Causing The Level Of Inoperability. In Turn, The Computing Device 102-2 Identifies A Solution And Provides Repair Information To The Computing Device 102-1

240 – The Computing Device 102-1 Cures The Level Of Inoperability Using The Repair Information Provided By Computing Device 102-2

TECHNIQUES FOR REPAIRING AN INOPERABLE AUXILIARY DEVICE USING ANOTHER DEVICE

CROSS-REFERENCE TO RELATED APPLICATIONS

The present application claims the benefit of U.S. Provisional Application No. 62/507,187, entitled "TECHNIQUES FOR REPAIRING AN INOPERABLE AUXILIARY DEVICE USING ANOTHER DEVICE," filed May 16, 2017, the content of which is incorporated herein by reference in its entirety for all purposes.

FIELD

The described embodiments relate generally to computing devices that are configured to communicate with and repair one another. More particularly, the described embodiments involve enabling another computing device to repair an auxiliary computing device when the auxiliary computing device detects a level of inoperability.

BACKGROUND

Recent years have shown a proliferation in the average number and types of computing devices that are owned by individuals. For example, it is common for an individual to own a laptop device, a tablet device, a smartphone device, a wearable device (e.g., fitness tracker), a pair of headphones, a set-top-box, and so on. Notably, owning these devices can deliver a rich user experience as each device can provide specialized functionality to meet a given user's needs throughout the day. However, owning these devices can also present the ongoing challenge of effectively maintaining their individual configurations—especially for devices that lack rich user interfaces. Consider, for example, an accessory device that does not include a keyboard, yet needs to access a WiFi network to properly function. In this example, it can be necessary for a paired device (e.g., a smartphone) to provide WiFi information to the accessory device during an initial setup procedure of the accessory device. However, at a later time, the accessory device can encounter difficulty in accessing the WiFi network for a variety of reasons. For example, a memory (that stores the WiFi information) in the accessory device can be reset, a name/password of the WiFi network can change, the WiFi network can be disabled, and so on. Consequently, the accessory device can experience a level of inoperability that can be difficult to identify and cure.

SUMMARY

To cure the foregoing deficiencies, the representative embodiments set forth herein disclose various techniques for enabling an auxiliary computing device to self-diagnose a level of inoperability, and, when appropriate, advertise to at least one nearby computing device that a repair procedure should be carried out. In turn, a nearby computing device can generate/provide a repair procedure to the auxiliary computing device, whereupon the auxiliary computing device can carry out the repair procedure and restore operability.

According to some embodiments, a method is disclosed for enabling a computing device to cure a configuration issue associated with an auxiliary computing device. The method can include the steps of (1) receiving, from the auxiliary computing device, a request to repair the configuration issue, where the request includes device information associated with the auxiliary computing device, and (2) in response to determining, based on the device information, that the auxiliary computing device is known to the computing device: (i) establishing a secure communication link with the auxiliary computing device, (ii) identifying at least one problem associated with the configuration issue, (iii) generating repair information based on the at least one problem, and (iv) transmitting the repair information to the auxiliary computing device over the secure communication link to cause the auxiliary computing device to cure the at least one problem.

According to some embodiments, another method is disclosed for enabling a configuration issue associated with an auxiliary computing device to be cured by a computing device. The method can include the steps of (1) issuing a request to repair the configuration issue, where the request includes device information associated with the auxiliary computing device, (2) receiving, from the computing device, an acceptance to cure the configuration issue, and (3) in response to determining that the computing device is known to the auxiliary computing device: (i) establishing a secure communication link with the computing device, (ii) providing, to the computing device, at least one problem associated with the configuration issue, (iii) receiving repair information from the computing device over the secure communication link, and (iv) utilizing the repair information to cure the at least one problem.

Other embodiments include a non-transitory computer readable storage medium configured to store instructions that, when executed by a processor included in a computing device, cause the computing device to carry out the various steps of any of the foregoing methods. Further embodiments include a computing device that is configured to carry out the various steps of any of the foregoing methods.

Other aspects and advantages of the invention will become apparent from the following detailed description taken in conjunction with the accompanying drawings that illustrate, by way of example, the principles of the described embodiments.

BRIEF DESCRIPTION OF THE DRAWINGS

The disclosure will be readily understood by the following detailed description in conjunction with the accompanying drawings, wherein like reference numerals designate like structural elements.

DETAILED DESCRIPTION

Figure 1:
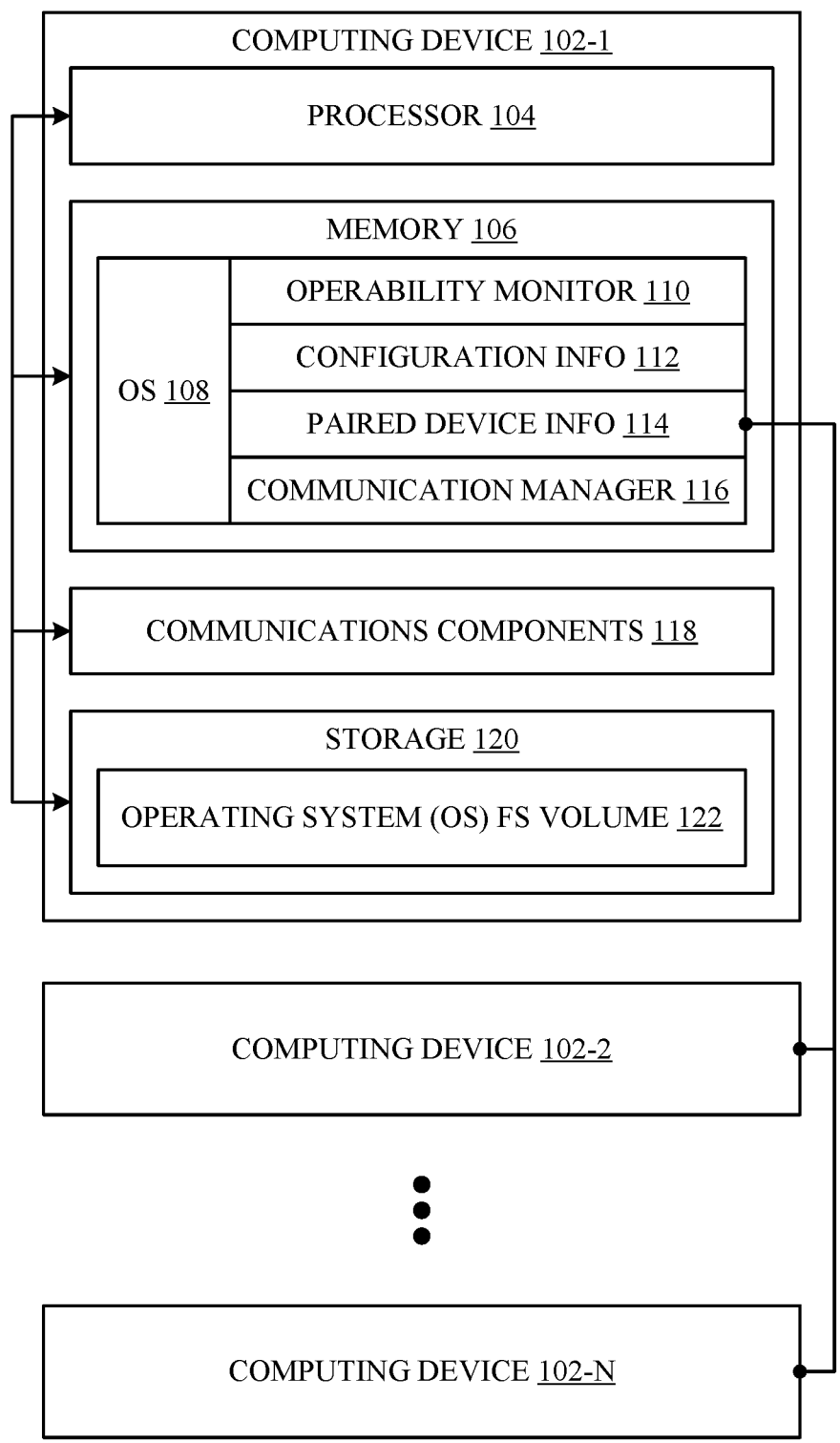
FIG. 1 illustrates a block diagram of different computing devices that can be configured to implement different aspects of the various techniques described herein, according to some embodiments.

Representative applications of apparatuses and methods according to the presently described embodiments are provided in this section. These examples are being provided solely to add context and aid in the understanding of the described embodiments. It will thus be apparent to one skilled in the art that the presently described embodiments can be practiced without some or all of these specific details. In other instances, well known process steps have not been described in detail in order to avoid unnecessarily obscuring the presently described embodiments. Other applications are possible, such that the following examples should not be taken as limiting.

The embodiments described herein set forth techniques for an auxiliary computing device—e.g., a computing device having minimal user interface components (e.g., a set-top box, a speaker, a pair of wireless headphones, a fitness tracker, etc.)—to self-identify a level of inoperability, and issue requests to nearby devices for repair assistance (e.g., when the inoperability persists for a threshold amount of time). According to some embodiments, the request can indicate that the inoperability is taking place, and include device information for identifying the auxiliary computing device. In particular, any computing devices that previously were or are actively paired with the auxiliary computing device can maintain paired device information associated with the auxiliary computing device. In this manner, the computing devices are able to identify when the request is being issued by a known device (i.e., the auxiliary computing device) to which they should respond. Additionally, one or more encryption keys (e.g., passcodes, symmetric encryption keys, asymmetric encryption keys, etc.)—which are known to both the auxiliary computing device and the computing devices, and can be established at a time of their initial pairing(s)—can be stored along with the paired device information. In this regard, when one of the computing devices indicates an acceptance to assist the auxiliary computing device, the one or more encryption keys can be utilized to establish a secure communication link. In turn, the auxiliary computing device can indicate specific details to the computing device about the problem (e.g., invalid WiFi credentials, invalid user account credentials, invalid encryption key sets, etc.), thereby enabling the computing device to generate the appropriate repair information and provide it to the auxiliary computing device. In turn, the auxiliary computing device receives and processes the repair information, and can indicate back to the computing device whether the inoperability has been cured. For example, when the inoperability has not been cured, the computing device can re-attempt to assist the auxiliary computing device. In contrast, when the inoperability has been cured, the auxiliary computing device can indicate that the assistance is no longer required, whereupon the secure communication link can be eliminated and the auxiliary computing device can function as intended.

It is noted that the embodiments described herein are primarily directed toward curing inoperability issues occurring at auxiliary computing devices. However, it is noted that the embodiments can be applied to any scenario in which the auxiliary computing devices require some form of assistance. For example, and auxiliary computing device can be notified when a software update is available, and, in turn, issue requests to nearby computing devices for assistance in carrying out the software update. This can be beneficial, for example, when the software update is large and/or formatted in a manner such that it is more efficient for a nearby computing device to pre-process the software update and deliver the software update to the auxiliary computing device. In another example, the auxiliary computing device can seek assistance when configuration settings become outdated, when new configuration settings become available, and so on.

A more detailed discussion of these techniques is set forth below and described in conjunction with FIGS. 1, 2A-2D, and 3-6, which illustrate detailed diagrams of systems and methods that can be used to implement these techniques.

FIG. 1 illustrates a block diagram 100 of different computing devices 102 that can be configured to implement various aspects of the techniques described herein, according to some embodiments. Specifically, FIG. 1 illustrates a high-level overview of a computing device 102, which, as shown, can include at least one processor 104, at least one memory 106, and at least one storage 120 (e.g., a hard drive, a solid-state storage drive (SSD), etc.). According to some embodiments, the processor 104 can be configured to work in conjunction with the memory 106 and the storage 120 to enable the computing device 102 to implement the various techniques set forth in this disclosure. According to some embodiments, the storage 120 can represent a storage that is accessible to the computing device 102, e.g., a hard disk drive, a solid-state drive, a mass storage device, a remote storage device, and the like. For example, the storage 120 can be configured to store an operating system (OS) file system volume 122 that can be mounted at the computing device 102, where the OS file system volume 122 includes an OS 108 that is compatible with the computing device 102.

According to some embodiments, and as shown in FIG. 1, the OS 108 can enable an operability monitor 110 to execute on the computing device 102. It will be understood that the OS 108 can also enable a variety of other processes to execute on the computing device 102, e.g., OS daemons, native OS applications, user applications, and the like. According to some embodiments, the operability monitor 110 can be configured to manage configuration information 112 that enables the operability monitor 110 to carry out the techniques described herein. According to some embodiments, the configuration information 112 can include any information that can be shared with other computing devices 102, e.g., WiFi information (e.g., Service Set Identifiers (SSIDs)/passwords/encryption keys), user account information (e.g., cloud account logins/passwords/encryption keys), encryption key sets, and so on. It is noted that the foregoing examples are not meant to represent an exhaustive list in any manner, and that any form of information can be included in the configuration information 112 and shared with other computing devices 102 where appropriate. Additionally, the operability monitor 110 can be configured to manage paired device information 114 that enables the operability monitor 110 to identify related computing devices 102 with which the computing device 102 has previously paired. For example, the paired device information 114 can include, for each computing device 102 with which the computing device 102 previously paired, a unique identifier (ID) associated with the computing device 102, one or more encryption keys associated with the computing device 102, and so on.

Additionally, and as shown in FIG. 1, the OS 108 can also enable the execution of a communication manager 116. According to some embodiments, the communication manager 116 can interface with different communications components 118 that are included in the computing device 102. The communications components 118 can include, for example, a WiFi interface, a Bluetooth interface, a Near Field Communication (NFC) interface, a cellular interface, an Ethernet interface, and so on. It is noted that these examples are not meant to represent an exhaustive list in any manner, and that any form of communication interface can be included in the communications components 118. In any case, the communication manager 116 can also be configured to interface with the operability monitor 110 to provide relevant information about communications that are transmitted/received through the communications components 118. For example—and as described in greater detail herein—the communication manager 116 can receive, via the communications components 118, an indication that a nearby computing device 102 is experiencing some form of inoperability, and notify the operability monitor 110. In turn, the operability monitor 110 can identify, using the paired device information 114, whether the nearby computing device 102 is known to the computing device 102. In particular, when nearby computing device 102 is known to the computing device 102, the computing device 102 can engage with the nearby computing device 102 and provide repair information that can be utilized by the nearby computing device 102 to cure the inoperability. Otherwise, when the nearby computing device 102 is not known to the computing device 102, the computing device 102 can ignore the indication.

Additionally, the operability monitor 110 can be configured to monitor the overall operability of the computing device 102 in a manner that enables the computing device 102 to self-identify when problems occur and repair assistance is needed. In particular, the operability monitor 110 can be configured to interface with a variety of software/hardware components included in the computing device 102, and detect/receive indications of different levels of inoperability that occur at the computing device 102. For example, the operability monitor 110 can be configured to detect/receive an indication that a network connection (relied upon by the computing device 102) has entered into an inoperable state. In another example, the operability monitor 110 can be configured to detect/receive an indication that a user account (relied upon by the computing device 102) is no longer valid (e.g., is being rejected by a service associated with the user account). In yet another example, the operability monitor 110 can be configured to detect/receive an indication that an encryption key set (relied upon by the computing device 102) is not accepted by other computing devices 102 with which the computing device 102 communicates. It is noted that these examples do not represent an exhaustive list of the different issues that the operability monitor 110 can be configured to detect/receive an indication of during the operation of the computing device 102. On the contrary, the operability monitor 110 can be configured to (1) identify any level of inoperability within the computing device 102, and (2) interface with nearby/known computing devices 102 to cure the inoperability as appropriate.

Additionally, it is noted that a given computing device 102—e.g., a computing device 102-1—can limit itself to interacting only with nearby (i.e., physically-proximate) computing devices 102 in order to enhance the overall security of the various techniques set forth herein. Consider, for example, a scenario in which the computing device 102-1 becomes inoperable, and begins advertising its inoperability to the nearby computing devices 102. In turn, when one of the nearby computing devices 102—e.g., a nearby computing device 102-2—responds and offers assistance (e.g., through the transmission of signals), the computing device 102-1 can measure a signal strength of the signals to effectively gauge a distance at which the computing device 102-2 is disposed relative to the computing device 102-1. Conversely, the computing device 102-2 can also utilize the same techniques to perform a counterpart verification of the physical proximity of the computing device 102-1. In this manner, the computing device 102-1/102-2 can enforce a policy that requires a physical proximity threshold to be satisfied before engaging with one another. It is noted that any form of signal can be utilized, e.g., Bluetooth signals, Near Field Communication (NFC) signals, WiFi signals, cellular signals, and so on, to carry out the physical proximity determinations described herein. Additionally, it is noted that other forms of signals can be utilized, e.g., audio signals, motion signals (e.g., physical tapping), etc., to enable the computing devices 102 to effectively determine their distances relative to one another. In this manner, the computing devices 102 can implement distance thresholds that cause the computing devices 102 to automatically disregard attempted interactions from distant computing devices 102 (e.g., outside of the threshold) that potentially have malicious intent.

Accordingly, FIG. 1 sets forth a high-level overview of the different components/entities that can be included in each computing device 102 to enable the embodiments described herein to be properly implemented. As described in greater detail below, these components/entities can be utilized in a variety of ways to enable a computing device 102 to seamlessly restore a wholly or partially inoperable auxiliary computing device 102 to an operable state, thereby enhancing the overall user experience.

Figure 2A:
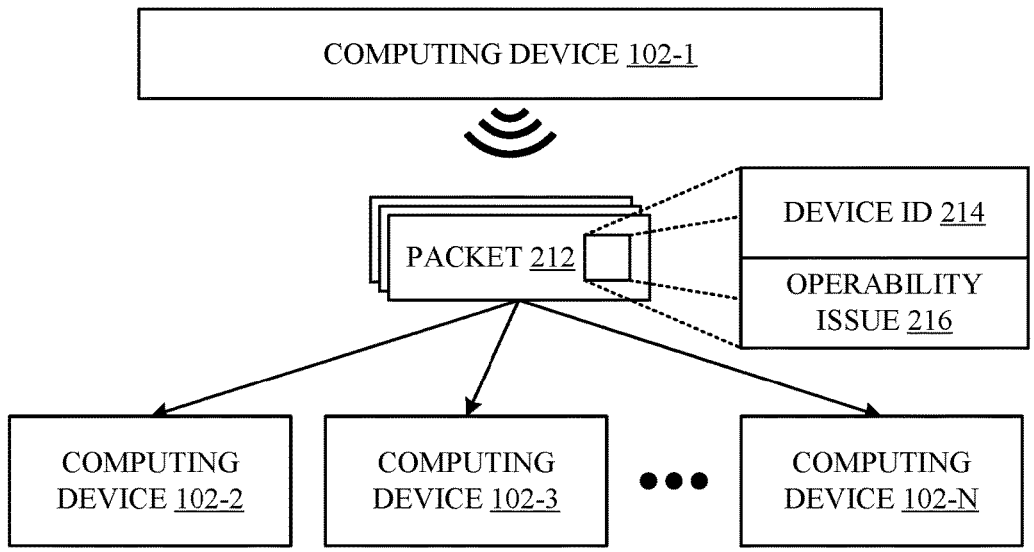
FIGS. 2A-2D illustrate conceptual diagrams of an example scenario in which an auxiliary computing device seeks assistance from a nearby computing device to cure a form of inoperability that is occurring at the auxiliary computing device, according to some embodiments.

FIGS. 2A-2D illustrate conceptual diagrams of an example scenario in which an auxiliary computing device 102 seeks assistance from a nearby computing device 102 to cure a form of inoperability that is occurring at the auxiliary computing device 102, according to some embodiments. As shown in FIG. 2A, a first step 210 can involve an auxiliary computing device—e.g., a computing device 102-1—identifying a level of inoperability occurring at the computing device 102-1. For example, an operability monitor 110 executing on the computing device 102-1 can identify the inoperability in accordance with the techniques described above in conjunction with FIG. 1. In turn, the operability monitor 110 can notify the communication manager 116 of the issue at hand, where, in turn, the computing device 102-1 enters into a repair mode in which the computing device 102-1 broadcasts messages indicating the problem to nearby computing devices 102. According to some embodiments, the communication manager 116 can cause the computing device 102-1 to issue, e.g., via Bluetooth communications, at least one packet 212 to nearby computing devices 102 to indicate that the computing device 102-1 is experiencing the inoperability. As shown in FIG. 2A, the packet 212 can include a device identifier (ID) 214 that is associated with/corresponds to the computing device 102-1, as well as an operability issue 216 that generically indicates that the computing device 102-1 is experiencing at least some level of inoperability.

Figure 2B:
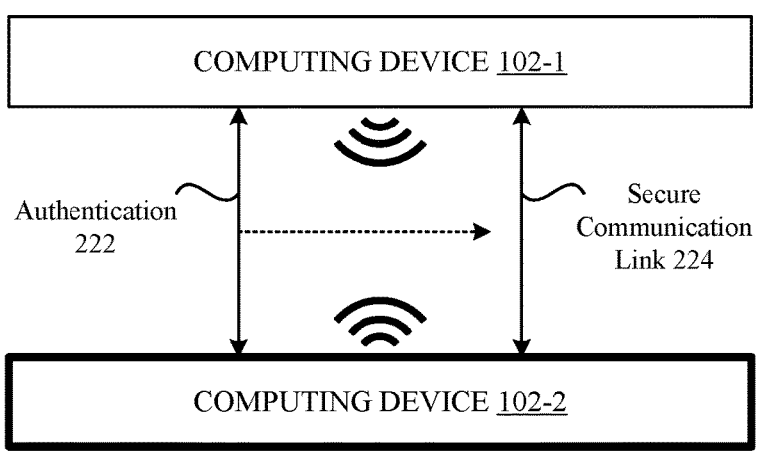

Next, in FIG. 2B, a second step 220 can involve a nearby computing device—e.g., a computing device 102-2—receiving and processing the packet 212 to identify whether any action should be taken. According to some embodiments, the operability monitor 110 executing on the computing device 102-2 can carry out an authentication 222 by comparing the device ID 214 (of the computing device 102-1) to the paired device information 114 managed by the computing device 102-2 to determine whether the computing device 102-1 is known to the computing device 102-2. For example, when the computing device 102-1 and the computing device 102-2 pair with one another (e.g., during an initial setup of the computing device 102-1), the computing device 102-1 and the computing device 102-2 can share (1) respective device IDs 214, and (2) at least one encryption key (e.g., a passcode) through which future secure communication links between the computing device 102-1 and the computing device 102-2 can be established. In this manner, at step 220, the computing device 102-2 can compare the device ID 214 (of the computing device 102-1) to the paired device information 114 (managed by the computing device 102-2) to identify that the computing device 102-1 is a known device. In turn, the computing device 102-2 can also obtain, from the paired device information 114, the at least one encryption key that is shared between the computing device 102-1 and computing device 102-2, and utilize the at least one encryption key to establish a secure communication link 224 with the computing device 102-1. For example, the at least one encryption key can be used to generate session encryption keys on which the secure communication link 224 can be based, thereby enhancing overall security.

Accordingly, at the conclusion of FIG. 2B, the computing device 102-2 is securely and communicably coupled with the computing device 102-1 via the secure communication link 224, and the computing device 102-2 understands—at least at a high-level—that some level of inoperability is occurring at the computing device 102-1 (based on the operability issue 216). It is noted that only generically indicating the operability issue 216 in the packets 212 can improve security. More specifically, nearby malicious devices capable of monitoring the packets 212 can only gather basic information about the inoperability issues of the computing device 102-1. However, this approach can necessitate additional communications to take place between the computing device 102-1 and the computing device 102-2 after the secure communication link 224 is formed, e.g., communications that specifically indicate the inoperability issue so that the computing device 102-2 can effectively help repair the computing device 102-1.

Figure 2C:
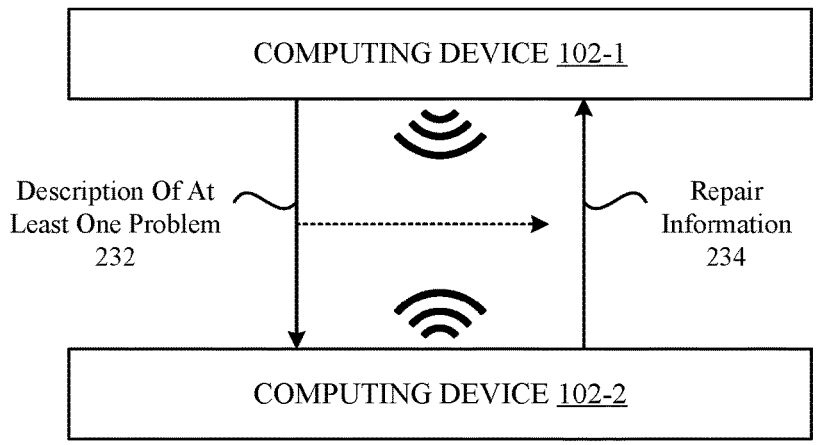

Accordingly, a third step 230 illustrated in FIG. 2C captures these additional communications. For example, as shown in FIG. 2C, the step 230 involves the computing device 102-1 providing a description 232 (e.g., via additional packets 212) of at least one problem that is causing the level of inoperability. In turn, the computing device 102-2 can (1) process the description 232 and identify specific data and/or a course of action for repairing the computing device 102-1, and (2) generate repair information 234 to be transmitted to the computing device 102-1. For example, when the computing device 102-1 lacks valid WiFi information for accessing a WiFi network, the computing device 102-2 can identify valid WiFi information—e.g., WiFi information (e.g., an SSID and password) associated with a WiFi network to which the computing device 102-2 is actively connected—and provide the valid WiFi information to the computing device 102-1 in the form of the repair information 234. It is noted that additional layers of authentication can be implemented to enhance the overall security of the techniques described herein. For example, prior to providing the WiFi information, the computing device 102-2 can require an authentication to first take place at the computing device 102-2. For example, the computing device 102-2 can prompt a user to enter login credentials associated with the computing device 102-2 so that it can be determined, at least to a reliable degree, that an authorized user is operating the computing device 102-2 and should be trusted.

Figure 2D:

Finally, a fourth step 240 illustrated in FIG. 2D can involve the computing device 102-1 processing the repair information 234 to cure the level of inoperability that the computing device 102-1 is experiencing. Continuing with the examples set forth above in conjunction with FIG. 2C, this can involve the computing device 102-1 extracting the WiFi information from the repair information 234, and providing the WiFi information to the communication manager 116 executing on the computing device 102-1. In turn, the communication manager 116 can interface with the communications components 118 to attempt to connect to the WiFi network, and wait for feedback from the communications components 118 on whether the connection is successful. In either case, the computing device 102-1 can communicate the results (e.g., via additional packets 212) back to the computing device 102-2. For example, the computing device 102-1 can indicate, to the computing device 102-2, that the computing device 102-1 was successful in establishing the connection to the WiFi network. Alternatively, the computing device 102-1 can indicate, to the computing device 102-2, that the computing device 102-1 was not successful in establishing the connection to the WiFi network. In this case, the computing device 102-2 can take any course of action and reattempt to assist the computing device 102-1. For example, the computing device 102-2 can attempt to provide updated WiFi information to the computing device 102-1, cause the computing device 102-1 to perform a reboot, cause the computing device 102-1 to obtain and install a software update, and so on.

Accordingly, FIGS. 2A-2D set forth conceptual diagrams of an example scenario in which the computing device 102-1 receives assistance from the computing device 102-2 to cure a form of inoperability that is occurring at the computing device 102-1, according to some embodiments. Next, FIGS. 3-5—which are described below in greater detail—provide a high-level breakdown of the techniques described herein.

Figure 3:
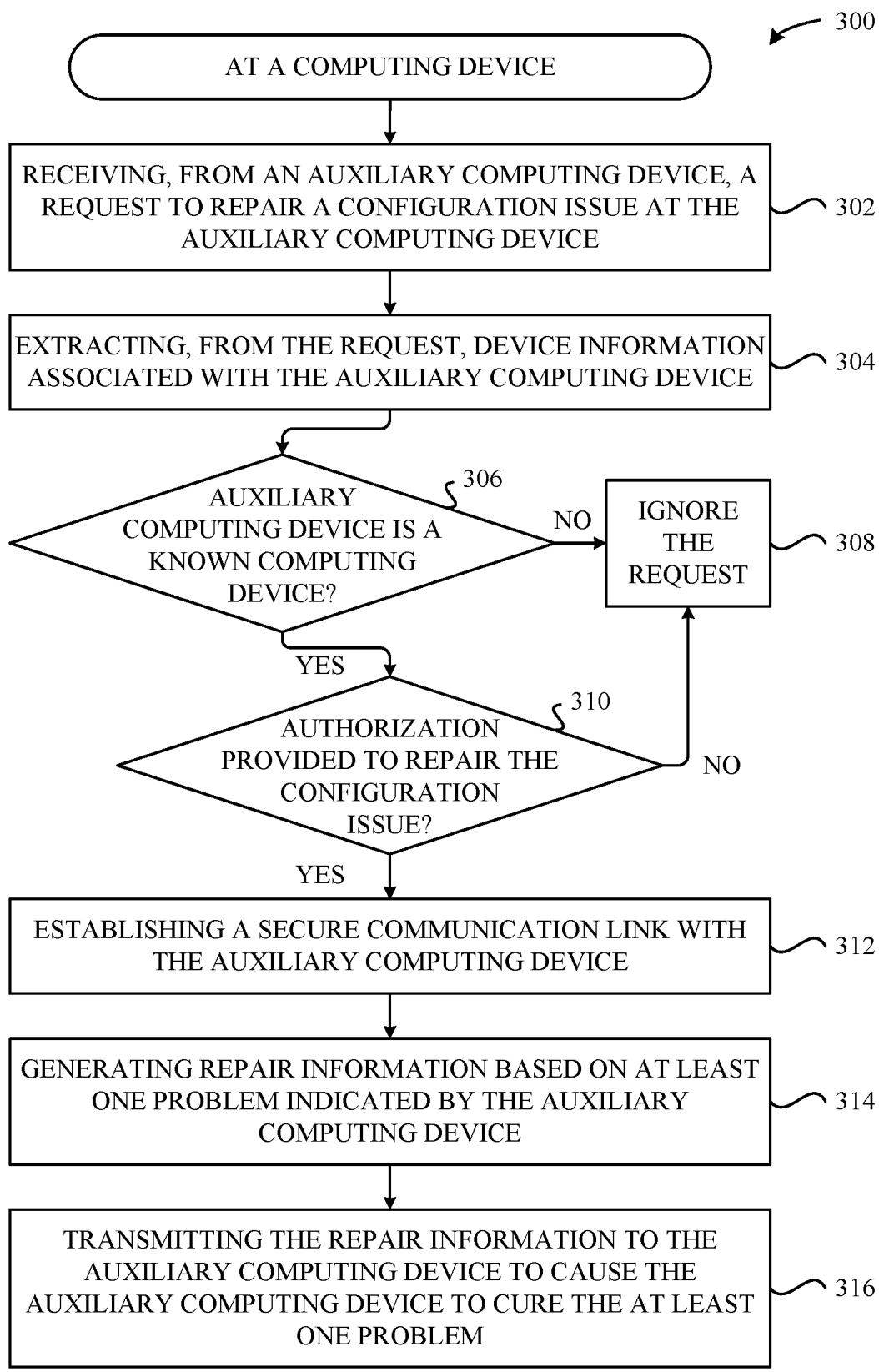
FIG. 3 illustrates a method in which a computing device assists an auxiliary computing device that is experiencing a level of inoperability, according to some embodiments.

In particular, FIG. 3 illustrates a method 300 in which a computing device 102 assists an auxiliary computing device 102 that is experiencing a level of inoperability, according to some embodiments. As shown in FIG. 3, the method 300 begins at step 302, where the computing device 102—specifically, the operability monitor 110 executing on the computing device 102—receives, from the auxiliary computing device 102, a request to repair a configuration issue that is causing the level of inoperability at the auxiliary computing device 102. At step 304, the operability monitor 110 extracts, from the request, device information associated with the auxiliary computing device 102.

At step 306, the operability monitor 110 determines whether the auxiliary computing device 102 is a known computing device 102. If, at step 306, the operability monitor 110 determines that auxiliary computing device 102 is a known computing device 102, then the method 300 proceeds to step 310. Otherwise, the method 300 proceeds to step 308, where the operability monitor 110 ignores the request, and can continue monitoring for additional requests issued by other computing devices 102 that are experiencing inoperability issues.

Next, at step 310, the operability monitor 110 determines whether an authorization is provided to repair the configuration issue. This can involve, for example, the computing device 102 (on which the operability monitor 110 is executing) issuing a prompt for an authorization to assist the auxiliary computing device 102. For example, the prompt can include a generic yes/no option that can be selected by the user. As previously described above, the prompt can also involve requiring additional levels of authentication to be provided by the user (e.g., providing login/unlock credentials associated with the computing device 102, biometric credentials associated with the user, physical button presses at the computing device, and so on). In any case, if, at step 310, the operability monitor 110 determines that an authorization is provided to repair the configuration issue, then the method 300 proceeds to step 312, which is described below in greater detail. Otherwise, the method 300 proceeds back to step 308, where operability monitor 110 ignores the request (as described above).

At step 312, the operability monitor 110 establishes a secure communication link with the auxiliary computing device 102. At step 314, the operability monitor 110 generates repair information based on at least one problem indicated by the auxiliary computing device 102. Finally, at step 316, the operability monitor 110 transmits the repair information to the auxiliary computing device 102 to cause the auxiliary computing device 102 to cure the at least one problem.

Figure 4:
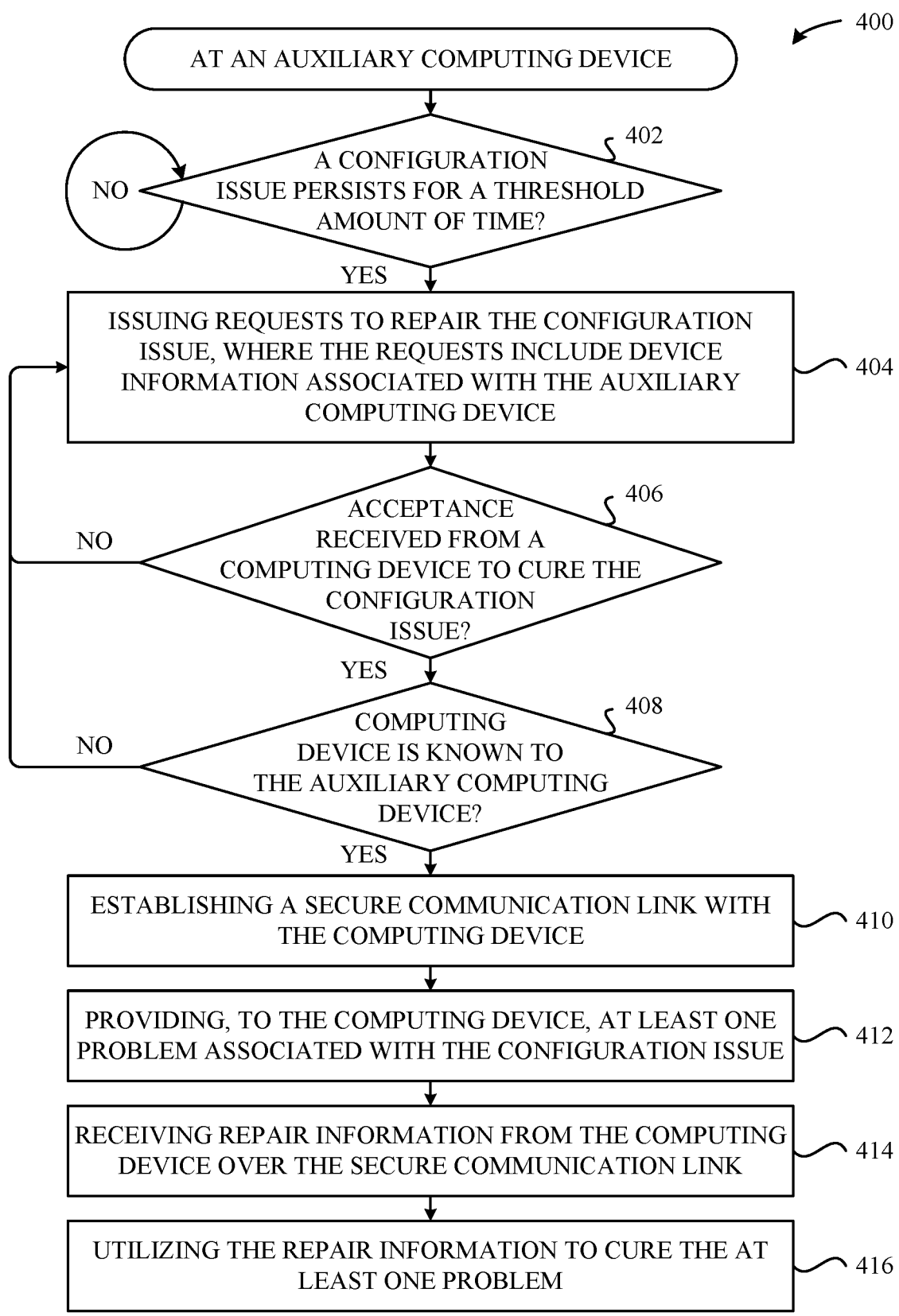
FIG. 4 illustrates a method in which an auxiliary computing device detects a level of inoperability and seeks repair assistance from nearby computing devices, according to some embodiments.

FIG. 4 illustrates a method 400 in which an auxiliary computing device 102 detects a level of inoperability and seeks repair assistance from nearby computing devices 102, according to some embodiments. As shown in FIG. 4, the method 400 begins at step 402, where the operability monitor 110 (executing on the auxiliary computing device 102) determines whether a configuration issue persists for a threshold amount of time. In particular, some of the issues detected by the operability monitor 110 may only be momentary, in which case it would be wasteful/cumbersome for the auxiliary computing device 102 to begin seeking assistance from nearby computing devices 102 when the problem might be automatically remedied. For example, when the auxiliary computing device 102 is connected to a WiFi network that frequently breaks down—but only for short periods of time—the auxiliary computing device 102 can avoid bothering nearby computing devices 102 (and their users) with requests to fix its WiFi connectivity.

Accordingly, if, at step 402, the operability monitor 110 determines that a configuration issue does not persist for a threshold amount of time, then the method 400 can remain at step 402, where the operability monitor 110 continues to monitor for any inoperability issues that persist for the threshold amount of time. Otherwise, the method 400 proceeds to step 404, where the operability monitor 110 enters into a mode in which requests to repair the configuration issue are periodically issued. At step 406, the operability monitor 110 determines whether an acceptance is received from a computing device 102 to cure the configuration issue, as described herein. If, at step 406, the operability monitor 110 determines that an acceptance is received from a computing device 102 to cure the configuration issue, then the method 400 proceeds to step 408, which is described below in greater detail. Otherwise, the method 400 proceeds to back to step 404, where the operability monitor 110 continues to cause the auxiliary computing device 102 to issue requests to repair the configuration issue.

At step 408, the operability monitor 110 determines whether the computing device computing device 102 (that issues the acceptance) is known to the auxiliary computing device 102. If, at step 408, the operability monitor 110 determines that the computing device 102 is known to the auxiliary computing device 102, then the method 400 proceeds to step 410. Otherwise, the method 400 proceeds back to step 404, where the operability monitor 110 continues to cause the auxiliary computing device 102 to issue requests to repair the configuration issue.

At step 410, the operability monitor 110 causes the auxiliary computing device 102 to establish a secure communication link with the computing device 102 in accordance with the techniques described herein. At step 412, the operability monitor 110 provides, to the computing device 102, a description of at least one problem associated with the configuration issue. In turn, at step 414, the operability monitor 110 receives repair information from the computing device 102 over the secure communication link. Finally, at step 416, the operability monitor 110 utilizes the repair information to cure the at least one problem.

Figure 5:
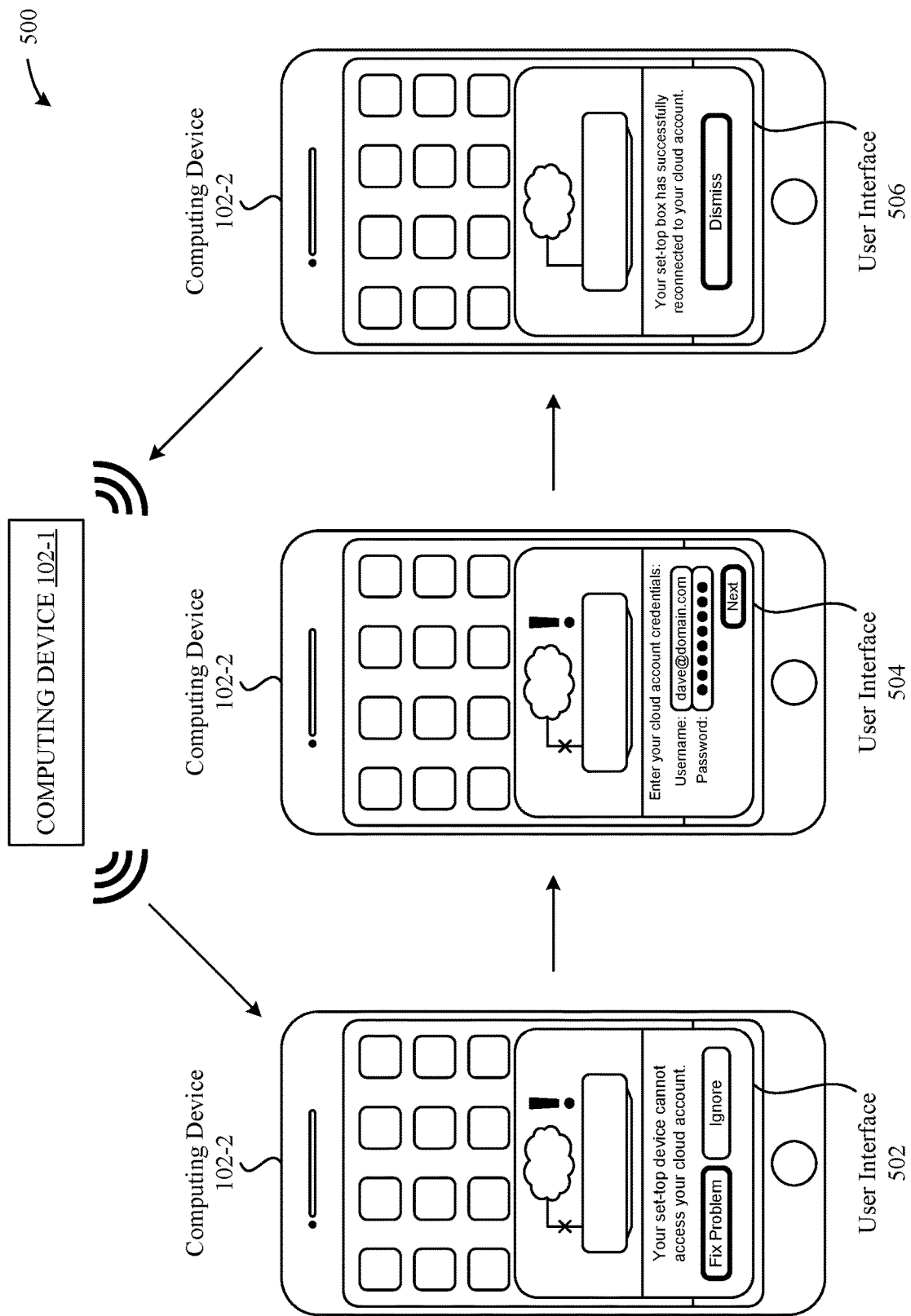
FIG. 5 illustrates a conceptual diagram of example user interfaces that can be implemented at a computing device that volunteers to cure at least one issue at an auxiliary computing device that is experiencing some level of inoperability, according to some embodiments.

Additionally, FIG. 5 illustrates a conceptual diagram 500 of example user interfaces that can be implemented at a computing device 102 that volunteers to cure at least one issue at an auxiliary computing device 102 that is experiencing some level of inoperability, according to some embodiments. As shown in FIG. 5, a computing device 102-1—specifically, an operability monitor 110 executing on the computing device 102-1—can detect the level of inoperability at the computing device 102-1, and issue requests to nearby computing devices 102 for assistance. In turn, one of the nearby computing devices 102—e.g., a computing device 102-2—can (1) obtain the request, (2) verify that the computing device 102-1 is known to the computing device 102-2 (e.g., based on pairing information), and (3) display a user interface 502 that indicates the issue at hand. For example, as shown in FIG. 5, the user interface 502 can include images/animations/sounds that draw attention to the computing device 102-2 and prompt a user about whether the computing device 102-2 should respond to or ignore the request. For example, in FIG. 5, the user interface 502 can indicate that a set-top box—i.e., the computing device 102-1—is no longer able to authenticate with a cloud service with which the computing device 102-1 was configured to interface at a time the computing device 102-1 conducted a setup procedure under the guidance of the computing device 102-2.

As shown in FIG. 5, a user selects an option within the user interface 502 to fix the problem, which causes the computing device 102-2 to display a user interface 504. As shown in FIG. 5, the user interface 504 can incorporate at least one of the additional security measures described herein. This can involve, for example, requiring a username/password combination to be provided at the computing device 102-2 to indicate, at least to a reliable degree, that an authorized user is operating the computing device 102-2. When the username/password combination is provided, the operability monitor 110 executing on the computing device 102-2 can generate and provide the repair information to the computing device 102-1 (in accordance with the techniques described herein). In turn, when the computing device 102-1 receives/utilizes the repair information—and successfully repairs the issue at hand—the computing device 102-1 can issue a notification to the operability monitor 110 (executing on the computing device 102-2) that indicates the inoperability issue has been repaired. In turn, the computing device 102-2 can display a user interface 506, which, as shown in FIG. 5, provides a notification that access to the cloud service has been restored at the computing device 102-1.

Accordingly, FIG. 5 illustrates the manner in which the embodiments described herein can provide a highly effective and efficient approach for enabling computing devices to assist one another as they encounter inoperability issues throughout their lifetime.

Accordingly, the embodiments described herein can enable a computing device to communicably couple with previously-paired devices, and provide assistance to those devices (e.g., by providing updated configuration information). Additionally, the embodiments set forth herein can also enable two computing devices (e.g., a primary and a secondary computing device) to establish an initial pairing in a secure an efficient manner that enables (1) an initial configuration of the secondary computing device, and (2) subsequent pairings between the primary and secondary computing devices (e.g., to carry out the repair techniques described herein). According to some embodiments, the initial pairing can involve configuring the secondary device based on a configuration of a primary device. This can involve, for example, the primary computing device providing user account credentials (e.g., for a cloud account) to the secondary computing device, where, in turn, the secondary computing device can access the cloud account and perform useful features e.g., obtaining configuration settings, content, etc., associated with the account. This can be beneficial as it eliminates the requirement for a user to redundantly input his or her user account credentials to the secondary computing device, which are often forgotten/tedious to input. Notably, it can be important to establish a secure communication link between the primary computing device and the secondary computing device, as the user account credentials are sensitive and should not be transmitted over an open channel. Moreover, the primary computing device can perform an authentication prior to providing the user account credentials to the secondary computing device to ensure that the primary computing device is being operated by an authorized user. A detailed breakdown of this process will now be provided below.

To carry out the initial pairing described above, the secondary computing device can begin by broadcasting (e.g., via Bluetooth) a request to perform an initial setup procedure. This can occur, for example, when the secondary computing device is powered-on "out-of-the-box" and requires an initial configuration to be performed, when the secondary computing device is restored to a factory state, and so on. In any case, the primary computing device can be configured to listen for the request issued by the secondary computing device (e.g., in response to a user loading a specific application), and engage with the secondary computing device upon receipt of the request. According to some embodiments, and prior to the primary computing device engaging the secondary computing device, the primary computing device can issue a prompt to the user to input a passcode that is associated with the primary computing device. In this manner, unauthorized users can be substantially prevented from attempting to obtain the user account credentials from the primary computing device. In any case, when the user is authorized at the primary computing device, the secondary computing device can encode a randomly-generated password that can be used as a basis to establish a secure communication channel. According to some embodiments, the password can be encoded into an animation that is displayed via a display component of the secondary computing device, in which case the primary computing device can observe the animation (e.g., via a camera component) and decode the password. In other embodiments, the password can be encoded into light signals, audio signals, other signals etc.—including any combination thereof—where, in turn, the primary computing device can obtain the signals (e.g., using appropriate sensors) and decode the password.

In any case, the primary computing device and the secondary computing device are in possession of the password after the primary computing device receives and decodes the password. In turn, the primary computing device and the secondary computing device can establish a secure communication channel based on the password. This can involve, for example, generating at least one encryption key (e.g., a symmetric key) that can be used as a basis for establishing the secure communication channel. Next, the primary computing device can provide the aforementioned user account credentials—as well as any other information deemed appropriate—to the secondary computing device over the secure communication channel. In turn, the secondary computing device can utilize the user account credentials to enable the secondary computing device to perform a variety of useful features, e.g., downloading configuration settings, downloading content, and so on. Additionally, the secondary computing device can issue a prompt for a new passcode (e.g., a six-digit number) to be assigned to the secondary computing device so that unauthorized access is less likely to occur. In turn, the primary computing device and the secondary computing device can remain paired to one another (e.g., to perform additional functionalities) over the secure communication link. Alternatively, the primary computing device and the secondary computing device can eliminate the secure communication link and go their separate ways.

In particular, any computing devices that previously were or are actively paired with the auxiliary computing device can maintain paired device information associated with the auxiliary computing device. In this manner, the computing devices are able to identify when the request is being issued by a known device (i.e., the auxiliary computing device) to which they should respond. Additionally, one or more encryption keys (e.g., passcodes, symmetric encryption keys, asymmetric encryption keys, etc.)—which are known to both the auxiliary computing device and the computing devices, and can be established at a time of their initial pairing(s)—can be stored along with the paired device information. In this regard, when one of the computing devices indicates an acceptance to assist the auxiliary computing device, the one or more encryption keys can be utilized to establish a secure communication link. In turn, the auxiliary computing device can indicate specific details to the computing device about the problem.

Figure 6:
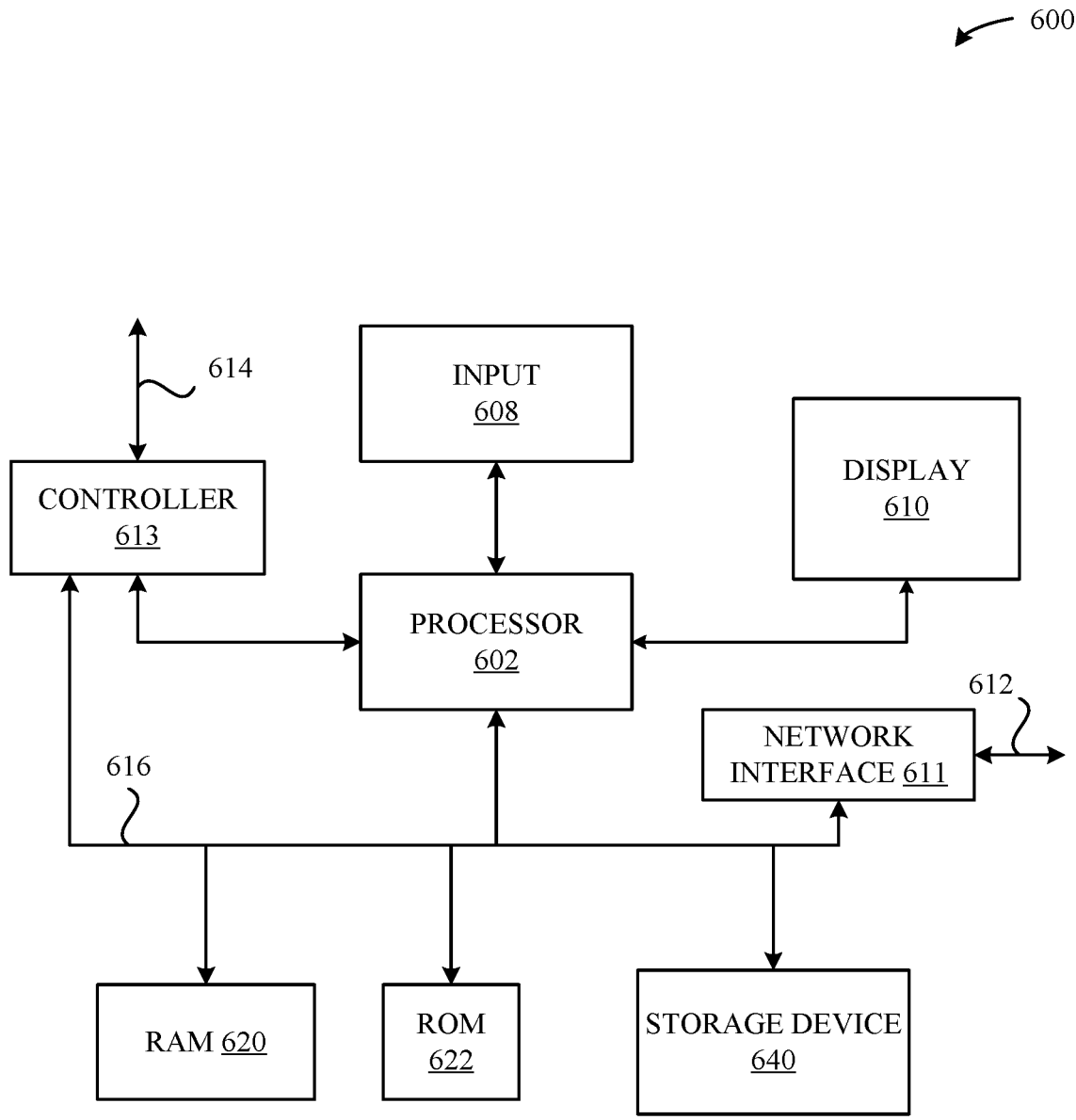
FIG. 6 illustrates a detailed view of a computing device that can represent the computing devices of FIG. 1 used to implement the various techniques described herein, according to some embodiments.

FIG. 6 illustrates a detailed view of a computing device 600 that can represent the computing devices of FIG. 1 used to implement the various techniques described herein, according to some embodiments. For example, the detailed view illustrates various components that can be included in the computing device 102 described in conjunction with FIG. 1. As shown in FIG. 6, the computing device 600 can include a processor 602 that represents a microprocessor or controller for controlling the overall operation of the computing device 600. The computing device 600 can also include a user input device 608 that allows a user of the computing device 600 to interact with the computing device 600. For example, the user input device 608 can take a variety of forms, such as a button, keypad, dial, touch screen, audio input interface, visual/image capture input interface, input in the form of sensor data, and so on. Still further, the computing device 600 can include a display 610 that can be controlled by the processor 602 (e.g., via a graphics component) to display information to the user. A data bus 616 can facilitate data transfer between at least a storage device 640, the processor 602, and a controller 613. The controller 613 can be used to interface with and control different equipment through an equipment control bus 614. The computing device 600 can also include a network/bus interface 611 that couples to a data link 612. In the case of a wireless connection, the network/bus interface 611 can include a wireless transceiver.

As noted above, the computing device 600 also includes the storage device 640, which can comprise a single disk or a collection of disks (e.g., hard drives). In some embodiments, storage device 640 can include flash memory, semiconductor (solid state) memory or the like. The computing device 600 can also include a Random-Access Memory (RAM) 620 and a Read-Only Memory (ROM) 622. The ROM 622 can store programs, utilities or processes to be executed in a non-volatile manner. The RAM 620 can provide volatile data storage, and stores instructions related to the operation of applications executing on the computing device 600.

The various aspects, embodiments, implementations or features of the described embodiments can be used separately or in any combination. Various aspects of the described embodiments can be implemented by software, hardware or a combination of hardware and software. The described embodiments can also be embodied as computer readable code on a computer readable medium. The computer readable medium is any data storage device that can store data which can thereafter be read by a computer system. Examples of the computer readable medium include read-only memory, random-access memory, CD-ROMs, DVDs, magnetic tape, hard disk drives, solid state drives, and optical data storage devices. The computer readable medium can also be distributed over network-coupled computer systems so that the computer readable code is stored and executed in a distributed fashion.

The foregoing description, for purposes of explanation, used specific nomenclature to provide a thorough understanding of the described embodiments. However, it will be apparent to one skilled in the art that the specific details are not required in order to practice the described embodiments. Thus, the foregoing descriptions of specific embodiments are presented for purposes of illustration and description. They are not intended to be exhaustive or to limit the described embodiments to the precise forms disclosed. It will be apparent to one of ordinary skill in the art that many modifications and variations are possible in view of the above teachings.

What is claimed is:

1. A method for enabling a computing device to cure at least one configuration issue associated with an auxiliary computing device, the method comprising, at the computing device:
   receiving, from the auxiliary computing device, a request to repair the at least one configuration issue, wherein the request:
      is issued by the auxiliary computing device in response to the auxiliary computing device self-identifying the at least one configuration issue, and
      includes (i) device information associated with the auxiliary computing device, and
         (ii) information associated with the at least one configuration issue; and
   in response to (1) determining, based on the device information, that the auxiliary computing device is known to the computing device, and (2) receiving an approval to cure the at least one configuration associated with the auxiliary computing device:
      establishing a secure communication link with the auxiliary computing device;
      generating repair information based on the at least one configuration issue; and
      transmitting the repair information to the auxiliary computing device over the secure communication link to cause the auxiliary computing device to cure the at least one configuration issue.

2. The method of claim 1, wherein the request is periodically transmitted by the auxiliary computing device, and the request is not specifically addressed to the computing device.

3. The method of claim 1, wherein the secure communication link is based on at least one shared key known to both the computing device and the auxiliary computing device.

4. The method of claim 3, wherein the at least one shared key is established when the computing device and the auxiliary computing device are first paired with one another.

5. The method of claim 1, wherein the at least one configuration issue comprises at least one of an invalid WiFi Service Set Identifier (SSID)/password, invalid cloud account credentials, or an invalid set of encryption keys.

6. The method of claim 1, wherein the approval is received in accordance with:
   presenting, via a user interface (UI) displayed at the computing device, a notification that the auxiliary computing device is seeking a repair of the at least one configuration issue; and
   receiving, via the UI, an authorization to generate and transmit the repair information.

7. The method of claim 6, further comprising, prior to establishing the secure communication link with the auxiliary computing device:
   providing, to the auxiliary computing device, an acceptance to cure the at least one configuration issue.

8. A method for enabling a configuration issue associated with an auxiliary computing device to be cured by a computing device, the method comprising, at the auxiliary computing device:
   self-identifying at least one configuration issue associated with the auxiliary computing device;
   issuing a request to repair the configuration issue, wherein the request includes (i) device information associated with the auxiliary computing device, and (ii) information associated with the at least one configuration issue;
   receiving, from the computing device, an acceptance to cure the configuration issue; and
   in response to (1) determining, based on the device information, that the auxiliary computing device is known to the computing device, and (2) receiving an approval to cure the at least one configuration associated with the auxiliary computing device:
      establishing a secure communication link with the computing device,
      receiving repair information from the computing device over the secure communication link, and
      utilizing the repair information to cure the at least one configuration issue.

9. The method of claim 8, wherein the request is issued in response to identifying that the configuration issue persists for a threshold amount of time.

10. The method of claim 9, further comprising, in conjunction with identifying the configuration issue:

causing a light emitting diode (LED) included on the auxiliary computing device to indicate the configuration issue.

11. The method of claim 8, wherein the request is not specifically addressed to the computing device.

12. The method of claim 8, wherein the secure communication link is formed using a session key based on at least one symmetric encryption key that is shared between the computing device and the auxiliary computing device.

13. The method of claim 12, wherein the at least one symmetric encryption key is established when the computing device and the auxiliary computing device are first paired with one another.

14. The method of claim 8, wherein the approval is received in accordance with:
 presenting, via a user interface (UI) displayed at the computing device, a notification that the auxiliary computing device is seeking a repair of the at least one configuration issue; and
 receiving, via the UI, an authorization to generate and transmit the repair information.

15. A non-transitory computer readable storage medium configured to store instructions that, when executed by a processor included in a computing device, cause the computing device to cure a configuration issue associated with an auxiliary computing device, by carrying out steps that include:
 receiving, from the auxiliary computing device, a request to repair the at least one configuration issue, wherein the request:
  is issued by the auxiliary computing device in response to the auxiliary computing device self-identifying the at least one configuration issue, and
  includes (i) device information associated with the auxiliary computing device, and
   (ii) information associated with the at least one configuration issue; and
 in response to (1) determining, based on the device information, that the auxiliary computing device is known to the computing device, and (2) receiving an approval to cure the at least one configuration associated with the auxiliary computing device:
  establishing a secure communication link with the auxiliary computing device;
  generating repair information based on the at least one configuration issue; and
  transmitting the repair information to the auxiliary computing device over the secure communication link to cause the auxiliary computing device to cure the at least one configuration issue.

16. The non-transitory computer readable storage medium of claim 15, wherein the request is periodically transmitted by the auxiliary computing device, and the request is not specifically addressed to the computing device.

17. The non-transitory computer readable storage medium of claim 15, wherein the secure communication link is based on at least one shared key known to both the computing device and the auxiliary computing device.

18. The non-transitory computer readable storage medium of claim 17, wherein the at least one shared key is established when the computing device and the auxiliary computing device are first paired with one another.

19. The non-transitory computer readable storage medium of claim 15, wherein the at least one configuration issue comprises at least one of an invalid WiFi Service Set Identifier (SSID)/password, invalid cloud account credentials, or an invalid set of encryption keys.

20. The non-transitory computer readable storage medium of claim 15, wherein the approval is received in accordance with:
 presenting, via a user interface (UI) displayed at the computing device, a notification that the auxiliary computing device is seeking a repair of the at least one configuration issue; and
 receiving, via the UI, an authorization to generate and transmit the repair information.

* * * * *